(12) United States Patent
Sandstrom et al.

(10) Patent No.: US 6,713,770 B2
(45) Date of Patent: Mar. 30, 2004

(54) HIGH RESOLUTION SPECTRAL MEASUREMENT DEVICE

(75) Inventors: Richard L. Sandstrom, Encinitas, CA (US); Alexander I. Ershov, San Diego, CA (US); William N. Partlo, Poway, CA (US); Igor V. Fomenkov, San Diego, CA (US); Scott T. Smith, San Diego, CA (US); Daniel J. W. Brown, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 10/098,975

(22) Filed: Mar. 15, 2002

(65) Prior Publication Data

US 2002/0121608 A1 Sep. 5, 2002

Related U.S. Application Data

(63) Continuation-in-part of application No. 10/003,513, filed on Oct. 31, 2001, now Pat. No. 6,538,737, and a continuation-in-part of application No. 09/772,293, filed on Jan. 29, 2001, now Pat. No. 6,480,275.

(51) Int. Cl.[7] .................................................. G01J 3/14
(52) U.S. Cl. ....................................... 250/372; 356/331
(58) Field of Search .......................... 250/372; 356/331, 356/332, 333, 334, 328, 305, 308

(56) References Cited

U.S. PATENT DOCUMENTS

| | | | | |
|---|---|---|---|---|
| 4,792,230 A | | 12/1988 | Naganuma et al. | .......... 356/345 |
| 4,995,721 A | * | 2/1991 | Krupa et al. | .................. 356/305 |
| 5,856,991 A | * | 1/1999 | Ershov | .......................... 372/57 |
| 6,421,365 B1 | | 7/2002 | Kleinschmidt et al. | ...... 372/108 |
| 6,480,275 B2 | | 11/2002 | Sandstrom et al. | ......... 356/328 |
| 6,538,737 B2 | * | 3/2003 | Sandstrom et al. | ......... 356/333 |
| 2002/0048288 A1 | | 4/2002 | Kroyan et al. | ................ 372/20 |

\* cited by examiner

Primary Examiner—Constantine Hannaher
Assistant Examiner—Otilia Gabor
(74) Attorney, Agent, or Firm—William Cray

(57) ABSTRACT

A high resolution spectral measurement device. A preferred embodiment presents an extremely narrow slit function in the ultraviolet range and is very useful for measuring bandwidth of narrow-band excimer lasers used for integrated circuit lithography. Light from the laser is focused into a diffuser and the diffused light exiting the diffuser illuminates an etalon. A portion of its light exiting the etalon is collected and directed into a slit positioned at a fringe pattern of the etalon. Light passing through the slit is collimated and the collimated light illuminates a grating positioned in an approximately Littrow configuration which disburses the light according to wavelength. A portion of the dispursed light representing the wavelength corresponding to the selected etalon fringe is passed through a second slit and monitored by a light detector. When the etalon and the grating are tuned to the same precise wavelength a slit function is defined which is extremely narrow such as about 0.034 pm (FWHM) and about 0.091 pm (95 percent integral). The bandwidth of a laser beam can be measured very accurately by a directing portion of the laser beam into the insulator and scanning the laser wavelength over a range which includes the monochromator slit wavelength. In a second embodiment the second slit and the light detector is replaced by a photodiod array and the bandwidth of a laser beam is determined by analyzing a set of scan data from the photodiode array. Alternately, the laser wavelength can be fixed near the middle of the spectrum range of the grating spectrometer, and the etalon can be scanned.

20 Claims, 8 Drawing Sheets

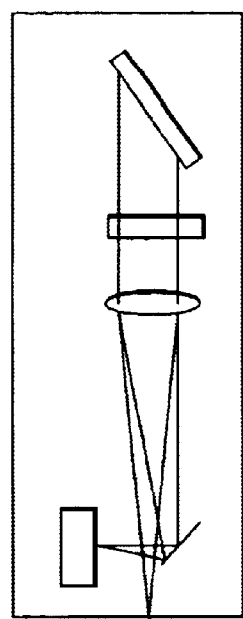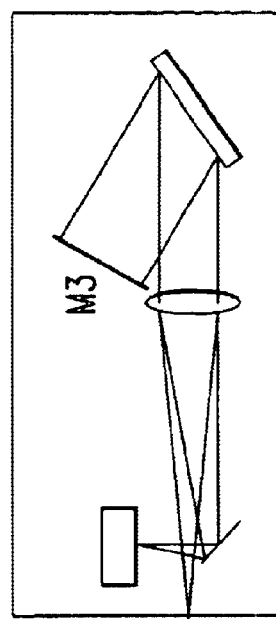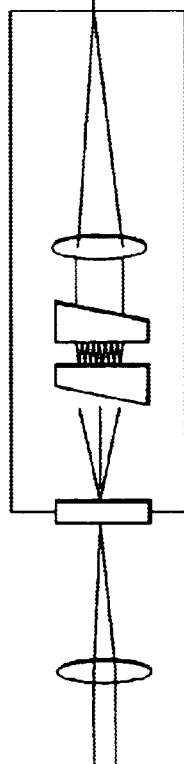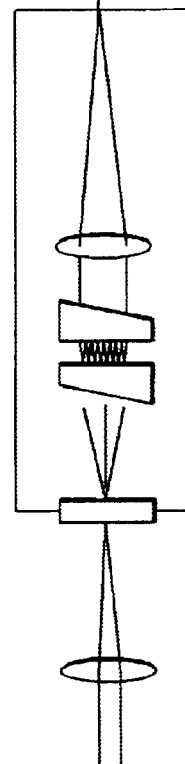
FIG. 8
FIG. 9

HIGH RESOLUTION SPECTRAL MEASUREMENT DEVICE

The present invention relates to spectral monitoring instruments and in particular to instruments for monitoring wavelengths of narrow band ultraviolet lasers. This invention is a continuation-in-part of U.S. patent application Ser. No. 09/772,293 filed Jan. 29, 2001 now U.S. Pat. No. 6,480,275 and U.S. patent application Ser. No. 10/003,513 filed Oct. 31, 2001 now U.S. Pat. No. 6,538,737.

BACKGROUND OF THE INVENTION

Spectrometers

Spectrometers are well known devices for measuring the intensity of light at various wavelengths. A typical spectrometer consists of a slit, a collimator lens, a dispersive optic, such as a prism or grating, an objective lens or lenses for focussing the various wavelengths and a photometer for measuring the intensity of the various wavelengths. FIG. 1A is a schematic drawing of such a prior art grating-based spectrometer. A light source 2 which is the subject of a wavelength measurement is sampled by an optical fiber 4 having an internal diameter of about 250 microns and a portion of the light is directed to slit 6 which is longer than the internal diameter of the fiber and has a width of about 5 microns. Light passing through slit 6 expands in the 5 micron direction in a beam 7 at an angle of about 3 degrees. The beam is reflected from mirror 8 and is collimated by lens 10 for illumination of grating 12 which in this prior art representation is arranged in a Littrow configuration. Light at various wavelengths reflecting from the grating is dispersed at angles dependant on the wavelengths. A beam representing only one wavelength is depicted in FIG. 1 as reflecting from the grating 12 back through lens 10 and reflecting off mirrors 8 and 14 and is focused to a line at 15. (The long dimension of the line is into and out of the page.) This particular wavelength is refocused at a line 17 by objective lens 16. Light at this wavelength is measured by a photometer 18, while light at other wavelengths is blocked by a slit 19 placed in front of the photometer 18. Slit 19 and photometer 18 are placed in the same housing. Light at wavelengths other than the depicted wavelength is reflected off grating 12 at angles slightly different from that of the depicted beam. Thus, other wavelengths are measured at positions above or below line 17 by photometer 18 which, as indicated in FIG. 1, moves back and forth, together with slit 19, to make these intensity measurements. (A monochromator is a device similar to a spectrometer which is configured to monitor only a single spectral band. In the FIG. 1 example configured as a monochromator the detector 18 would be stationary.

The resolution of this prior art spectrometer is limited by dispersion of the grating and its size. Both of these parameters can only be improved up to a certain level determined by technology limits and cost. If desired parameters still cannot be achieved, then several diffraction gratings can be used in more elaborate spectrometry. This will proportionally increase the resolution. However, these more elaborate techniques can substantially increase the cost and the size of the spectrometer. What is needed is a simple and inexpensive method of substantially increasing the precision of prior art spectrometers. A particular need exists for a compact, high resolution ultraviolet spectrometer with a resolution of the order of 0.05 μm. Such a spectrometer is needed to monitor the output spectrum of narrow band excimer lasers used, for example, in micro-lithography.

It is well known that a Fabry-Perot etalon may also be used as the dispersive element rather than a diffraction grating. Etalons are routinely capable of producing resolving powers on the order of $10^7$. Because etalons do not require the use of a slit aperture, their luminosity is high. Unfortunately, to achieve high resolving powers with an etalon spectrometer one would traditionally have to sacrifice free spectral range.

The transmission of an etalon when illuminated by a diffuse monochromatic source is maximized at specific angles. These fringes of equal inclination produce a concentric ring pattern when imaged by a lens. The angular separation between consecutive fringes of an etalon defines the FSR of the etalon in angle space. The relationship between the maximum angle θ, of an etalon with respect to wavelength is defined by:

$$m\lambda = 2\,nd\,\cos(\theta) \qquad (1)$$

where:

m=fringe order
n=index of refraction
d=plate separation of etalon

These multiple fringes or pass bands in the transmission of a single etalon limit its usefulness to a region between consecutive fringes. In a typical etalon spectrometer, the usable spectral range is limited to about 30 times its resolution. However, in order to measure the spectrum of an excimer laser used for microlithography a much larger spectral range is required.

Narrow Band Excimer Lasers

Line narrowed excimer lasers are currently used as the light source for microlithography. In order to provide integrated circuit feature sizes in the range of a small fraction of a micron, the bandwidth of the laser beam must be narrowed to a fraction of a picometer and the central wavelength must be controllable to an accuracy of a small fraction of a picometer. FIG. 1B is a drawing of a narrow band excimer laser system 1 showing a typical scheme for controlling the wavelength and bandwidth of these excimer lasers. A gain medium is created in laser chamber 22 by electric discharges between two elongated electrodes 24 (only the top electrode is shown). At the rear of the chamber, the laser beam exits into a line narrowing package, LNP, 26 which comprises a three prism beam expander 28, a tuning mirror 30 and a grating 32 arranged in a Littrow configuration. Tuning mirror 30 is arranged to pivot about an axis as indicated in the figure and its position is controlled by a precision driver unit 34 such as a stepper motor or a piezoelectric driver or a combination of the two for wide tuning range and precise control. Precise control is provided in a feedback arrangement in which a portion of the output beam downstream of output coupler 36 is sampled by very fast response wavemeter 38 which measures the central wavelength and bandwidth and controls the central wavelength to a target value by appropriate feedback signals to driver unit 34. In order to characterize the spectral properties of microlithography excimer lasers, two specifications are commonly used. The first one is the full-width-at-half-maximum ($\Delta\lambda_{FWHM}$), and the second one defines the range containing 95% of the total laser pulse energy. This specification is commonly referred to as $\Delta\lambda_{195\%}$ and it is especially useful to define the amount of energy which is contained in the spectrum tails. In the typical microlithography excimer laser, $\Delta\lambda_{195\%}$ is about three times larger than $\Delta\lambda_{FWHM}$. In order to accurately measure both $\Delta\lambda_{FWHM}$ and $\Delta\lambda_{195\%}$ a spectrometer with resolution of about 0.05 pm and usable spectrum scan range of at least 10 pm is required. These two parameters are extremely difficult to achieve simultaneously using prior art spectrometers. The etalon spectrometer, even though capable of providing 0.05 pm resolution, will have a usable scanning range limited to 1–2 pm at this resolution. On the other hand, grating spectrometer, having resolution of 0.05 pm at 193 nm is extremely bulky and very expensive device.

What is needed is a comparably inexpensive device which would provide simultaneously resolution of 0.05 pm and scanning range of 10 pm.

SUMMARY OF THE INVENTION

The present invention provides a high resolution spectral measurement device. A preferred embodiment presents an extremely narrow slit function in the ultraviolet range and is very useful for measuring bandwidth of narrow-band excimer lasers used for integrated circuit lithography. Light from the laser is focused into a diffuser and the diffused light exiting the diffuser illuminates an etalon. A portion of its light exiting the etalon is collected and directed into a slit positioned at a fringe pattern of the etalon. Light passing through the slit is collimated and the collimated light illuminates a grating positioned in an approximately Littrow configuration which disburses the light according to wavelength. A portion of the dispursed light representing the wavelength corresponding to the selected etalon fringe is passed through a second slit and monitored by a light detector. When the etalon and the grating are tuned to the same precise wavelength a slit function is defined which is extremely narrow such as about 0.034 pm (FWHM) and about 0.091 pm (95 percent integral). The bandwidth of a laser beam can be measured very accurately by a directing portion of the laser beam into the insulator and scanning the laser wavelength over a range which includes the monochromator slit wavelength. In a second embodiment the second slit and the light detector is replaced by a photodiod array and the bandwidth of a laser beam is determined by analyzing a set of scan data from the photodiode array. Alternately, the laser wavelength can be fixed near the middle of the spectrum range of the grating spectrometer, and the etalon can be scanned.

BRIEF DESCRIPTION OF THE DRAWINGS

FIGS. 8 and 9 show additional embodiments of the present invention.

DETAILED DESCRIPTION OF PREFERRED EMBODIMENTS

First Preferred Embodiment

Figure 1A:
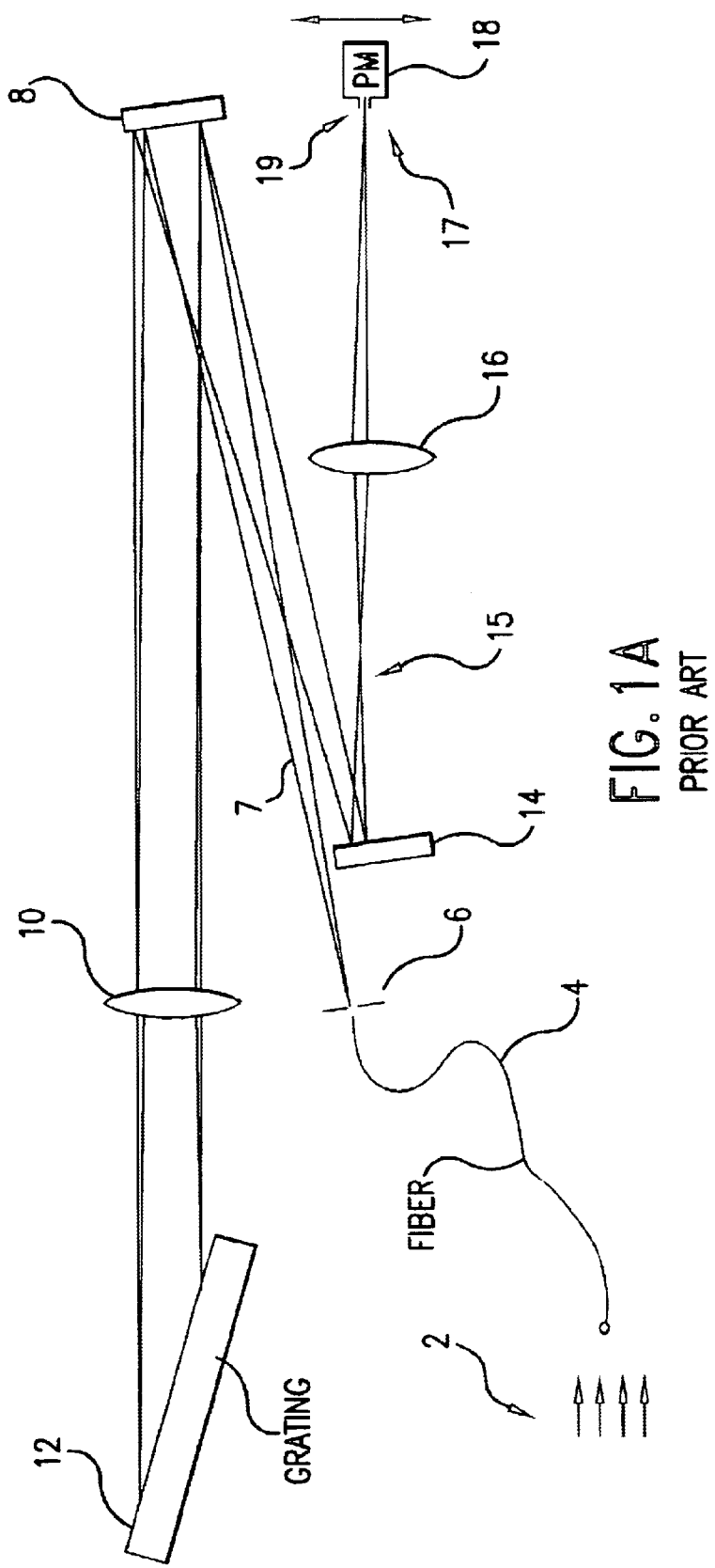
FIG. 1A shows a prior art grating spectrometer.
Figure 1B:
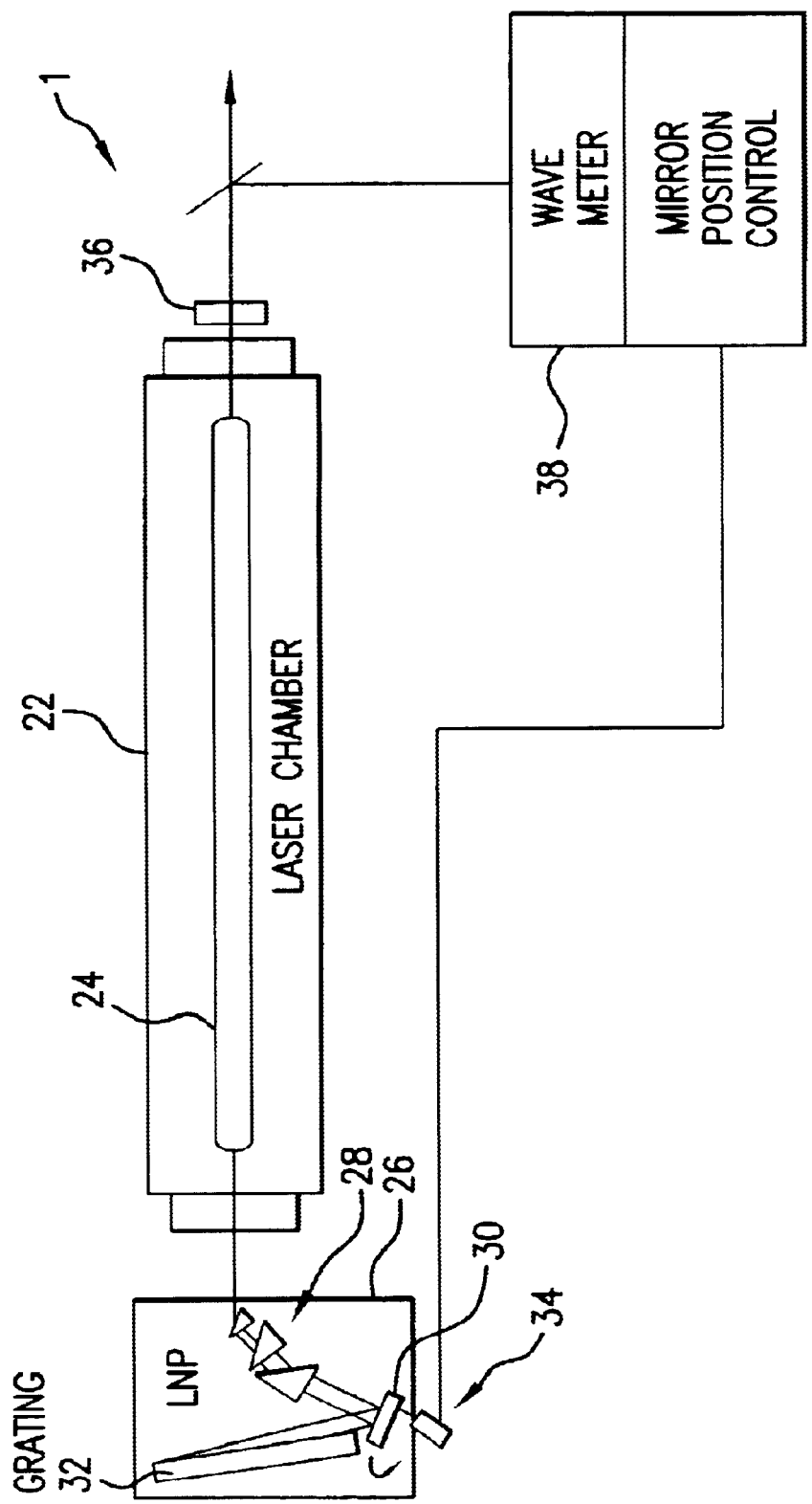
FIG. 1B shows features of a prior art excimer laser system.
Figure 2:
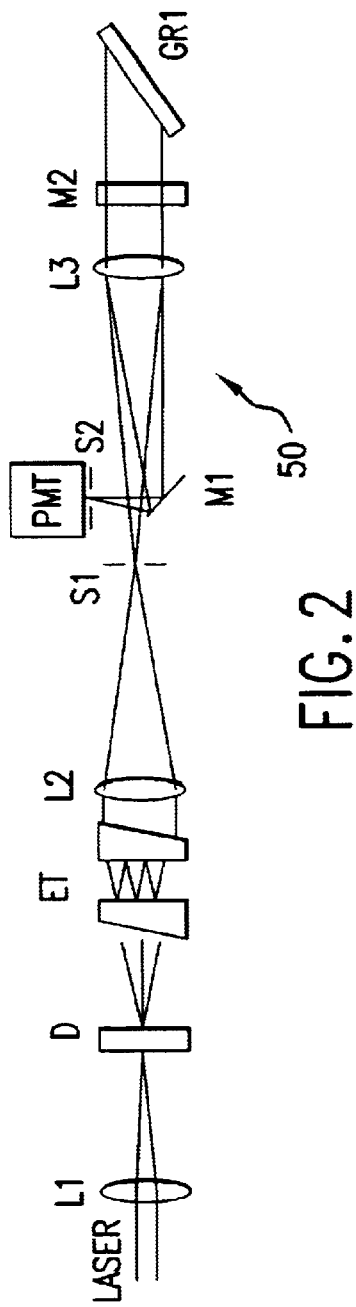
FIG. 2 shows a layout of elements of a first preferred embodiment of the present invention.

A first preferred embodiment of the present invention is described by reference to FIG. 2. A laser beam such as a portion of the beam directed into wavemeter 18 shown in FIG. 1, is focused by lens L1 into a diffuser, D. This diffuser could be a ground, fused silica diffuser of a holographic diffuser. The diffuser scatters the light before it enters into etalon ET. This etalon determines the FWHM resolution of the instrument and it should have the highest practical finesse. In a prototype system, Applicants used an etalon with a finesse of about 30 and FSR of 1.5 pm. The light, after passing through the etalon, is collected onto slit, S1, by lens L2, which has a focus length of 50 cm. A 5×200 µm slit was used. The etalon is aligned so that the slit S1, is in the exact center of the fringe pattern created by the etalon. This slit is the entrance slit of the grating spectrometer 50. The light is collimated by the lens L3, and illuminates a 250 mm echelle grating, GR1, which is arranged in an approximate Littrow configuration. A small deviation from Littrow enables pick-up mirror M1 to separate a portion of the diffracted beam and direct it into the exit slit S2, where the signal is measured with a photo-multiplier tube, PMT. A partially transmitting mirror M2, provides for a double pass on the grating in order to increase the dispersion. A portion of the light, reflected from GR1 for the first time, is then reflected by M2 back to the grating for the second pass. The second reflection from GR1, which passes through M2 is picked up by the mirror M1. This scheme allows the doubling of the grating dispersion with relative ease but at the cost of reduced efficiency. Efficiency, however, is usually not a problem. In essence, the spectrum measurement device is a combination of etalon and grating spectrometers.

With this scheme, the etalon and grating have to be tuned relative to each other and remained fixed during a wavelength scan. The scan is accomplished by scanning the wavelength of the laser. The exact wavelength can be controlled with the laser's internal wavemeter. Tuning of the grating spectrometer can be accomplished by either rotating grating GR1 or moving slit S2. Precise tuning the air gap of the etalon can be accomplished by enclosing the etalon in a sealed housing and connecting the housing to an adjustable bellows with flexible tubing. By compressing the bellows the gas pressure in the etalon air space and therefore the FSR of the etalon can be adjusted. The method used in the experiment was to tune the grating to the etalon and then scan the laser over several etalon FSRs.

Figure 3A:
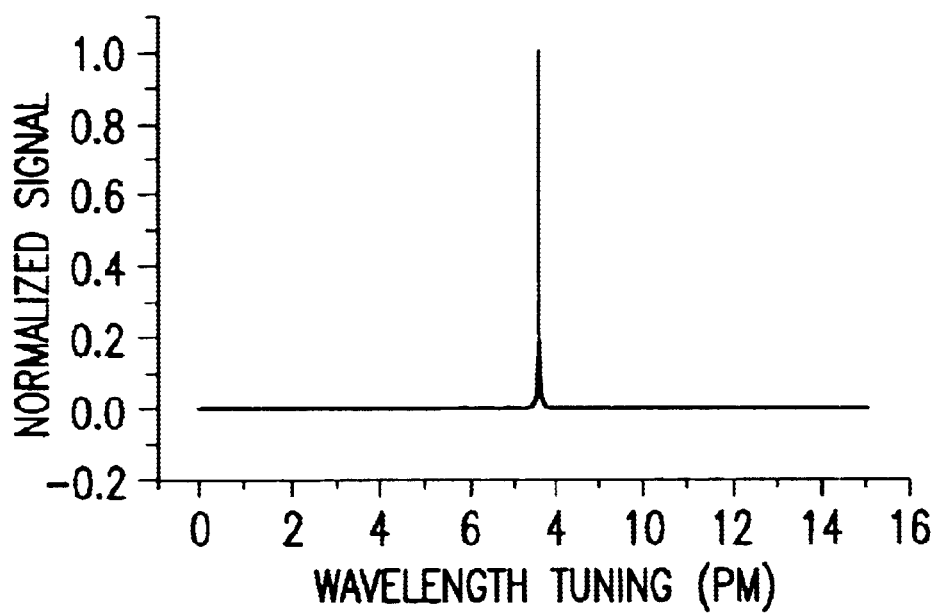
Figure 3B:
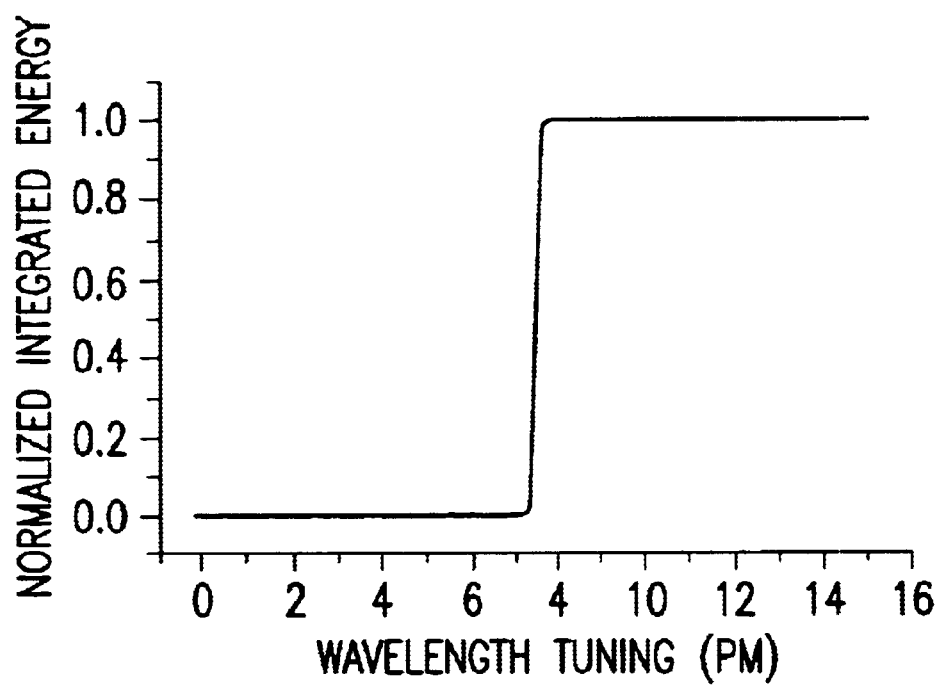

FIGS. 3A and 3B show the calculated slit function of this monochromator. $\Delta\lambda_{FWHM}$ of the slit function is 0.034 pm and $\Delta\lambda_{195\%}$=0.091 pm. This is a big improvement compared to $\Delta\lambda_{FWHM}$=0.11 pm and $\Delta\lambda_{195\%}$=0.5 pm for the double pass grating spectrometer alone.

Figure 4:
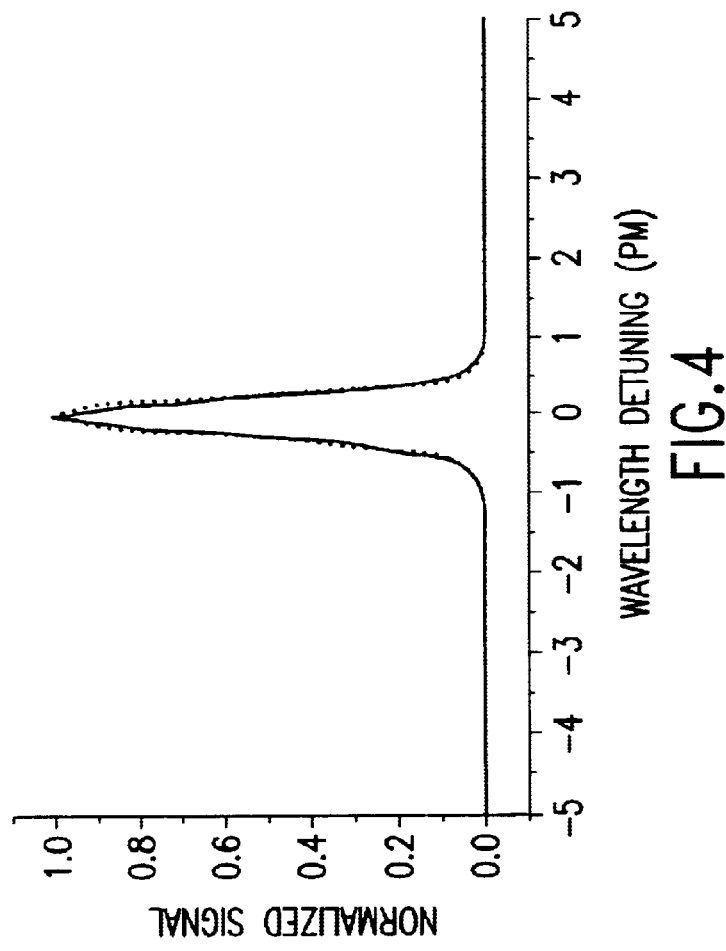
FIGS. 3 and 4 show performance data of the preferred embodiment in graphical form.

FIG. 4 shows the spectra of an ArF excimer laser measured with this new monochromator (dotted line) and with a double pass grating spectrometer (solid line). The measurements were done at different times, so the actual bandwidth of the laser might have been slightly different in these two cases. The shape of the spectrum, and in particular the ratio of $\Delta\lambda_{FWHM}/\Delta\lambda_{195\%}$ is quite consistent for the laser, however. The $\Delta\lambda_{FWHM}$ value for the monochromator is 0.54 pm as compared to 0.51 pm for the grating spectrometer. On the other hand, the $\Delta\lambda_{195\%}$ value for the monochromator is 1.03 pm as compared to 1.24 pm for the grating spectrometer. This shows that the monochromator resolves the tails better than the grating spectrometer, reducing the $\Delta\lambda_{195\%}$ value by about 0.2 pm. On the other hand, the improved resolution in $\Delta\lambda_{FWHM}$ for monochromator should not provide any significant effect on the measured bandwidth in the 0.5 pm range. So, slightly higher measured bandwidth in case of the monochromator is probably due to laser bandwidth fluctuations.

Second Preferred Embodiment

Figure 5:
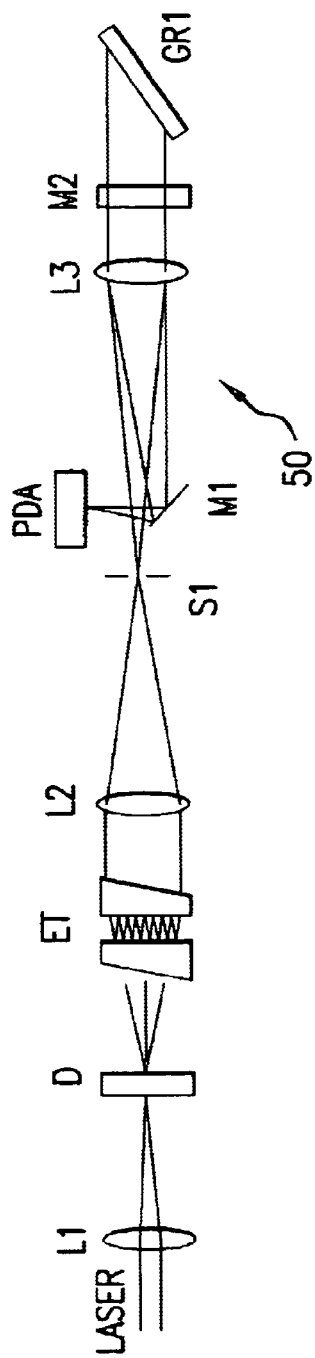
FIG. 5 shows a layout of a second preferred embodiment.

A second preferred embodiment of the present invention is described by reference to FIG. 5. A laser beam such as a portion of the beam directed into wavemeter 18 shown in FIG. 1, is focused by lens L1 into a diffuser, D. This diffuser could be a ground, fused silica diffuser of a holographic diffuser. The diffuser scatters the light before it enters into etalon ET. Here, just as in the first embodiment, the etalon determines the FWHM resolution of the instrument and it should have the highest practical finesse. The light, after passing through the etalon, is collected onto slit, S1, by lens L2, which has a focus length of 50 cm. A 5×200 μm slit can be used similar to the first embodiment. The etalon is aligned so that the slit S1, is in the exact center of the fringe pattern created by the etalon. This slit is the entrance slit of the grating spectrometer 50. The light is collimated by the lens L3, and illuminates a 250 mm echelle grating, GR1, which is arranged in an approximate Littrow configuration. A small deviation from Littrow enables pick-up mirror M1 to separate a portion of the diffracted beam and direct it into the exit slit S2, where the signal is measured with a photodiode array PDA. A partially transmitting mirror M2, provides for a double pass on the grating in order to increase the dispersion. A portion of the light, reflected from GR1 for the first time, is then reflected by M2 back to the grating for the second pass. The second reflection from GR1, which passes through M2 is picked up by the mirror M1. This scheme allows the doubling of the grating dispersion with relative ease but at the cost of reduced efficiency. Efficiency, however, is usually not a problem. The difference between the first and the second embodiments is that in the second embodiment, a PDA is used instead of the exit slit and a photo multiplier PMT.

The light reflected by the pick-up mirror M1 illuminates a photodiode array PDA. In this preferred embodiment, an array of 1024 pixels is used. The PDA records the spectrum of the light passed through the etalon ET and reflected from grating GR1. The spectrum range, which can be measured with array PDA is about 15 pm, so that there are about 10 etalon free spectral ranges in the spectrum range of spectrometer 50. With this scheme, the laser is scanned over the spectral range of the spectrometer by adjusting the pivot position of mirror 30 as shown in FIG. 1B.

For each scan point, an output spectrum of the grating spectrometer 50 monitoring the light from etalon ET passing through slit S1 is recorded by array PDA and saved in the memory of a computer (not shown).

As a result, there are now a spectrum saved for each laser wavelength $\lambda_1$ during the laser scan. The number of spectra equals the number of wavelength steps the laser makes during the wavelength scan.

Figure 6A:
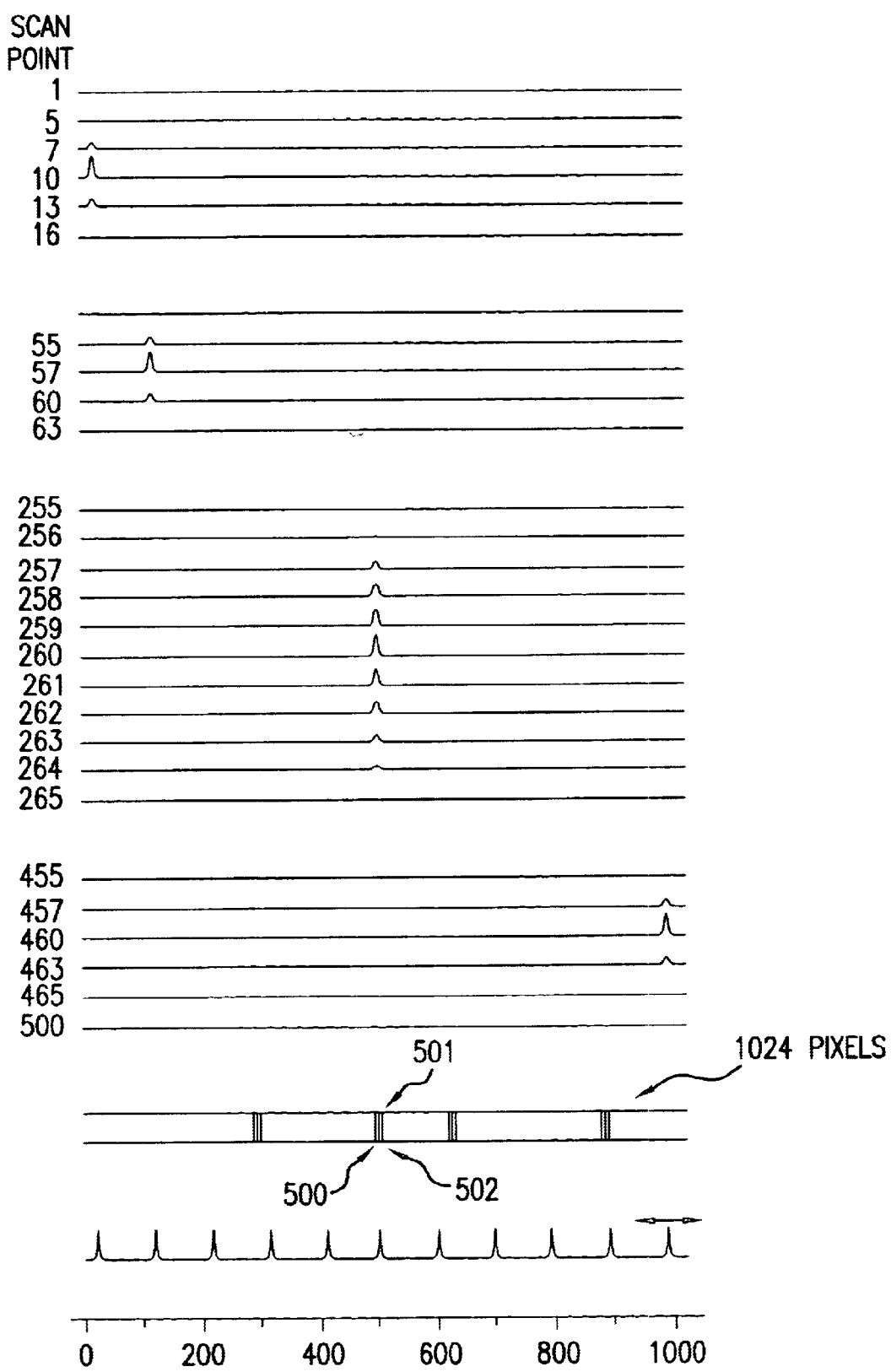
FIGS. 6A and 6B show examples of spectral PDA data used to calculate bandwidth.

Examples of such spectra are shown in FIG. 6. In some of these spectra, etalon ET transmission peaks are apparent. As the laser wavelength is scanned over one of these peaks, the signal peaks are recorded such as in scans 7 through 13, 256 through 264 and 457 through 463, for example. Position of peaks on these scans correspond to etalon transmission peaks. The FIG. 6A set of data represents 500 laser wavelength steps.

The spectrum of the laser is determined by analyzing these individual spectra. The spectrum with the largest peak near the middle of the laser wavelength scan is identified. That is spectrum number 260 in the FIG. 6A example.

Figure 7:
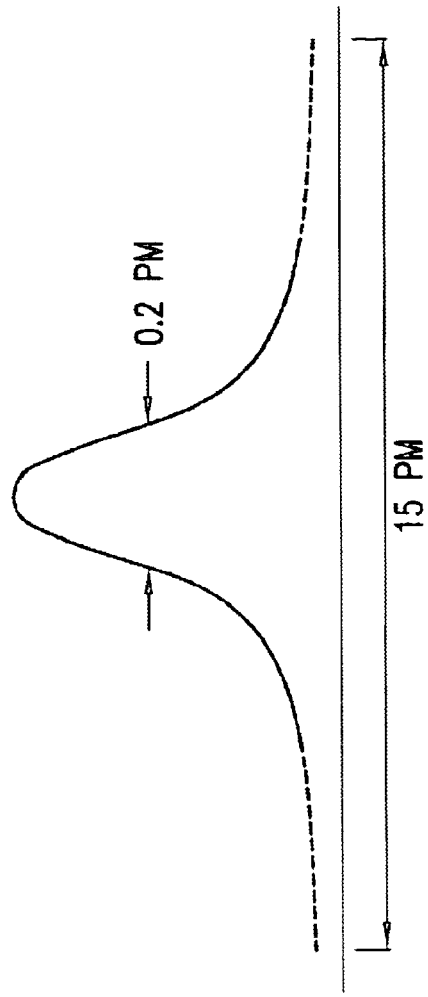
FIG. 7 shows a spectral plot.

The pixel corresponding position of the maximum in this spectrum (number 260) is identified. In the example it is pixel number 501. Then, for each spectrum curve, the signal from the same pixel number 501 is read from the computer memory. These values are the measured laser spectrum as shown in FIG. 7.

Another embodiment could be to use average values of several pixels around the maximum pixel to improve signal-to-noise. Also, each of 500 curves shown in the example of FIG. 6A are a result of several data acquisitions.

Another embodiment, FIG. 8, has etalon module separate from the grating spectrometer module. Both modules are connected by a fiber. The fiber picks up light at the center of concentric fringe pattern of the etalon (where the slit S1 is in FIGS. 2 and 5) and delivers it to the entrance slit of the grating spectrometer.

In another embodiment shown in FIG. 9, a double pass in the grating spectrometer is made with off-Littrow configuration, so that grating diffracts the beam towards mirror M3, and the mirror M3 then reflects the light back to the grating for the second pass.

Figure 6B:
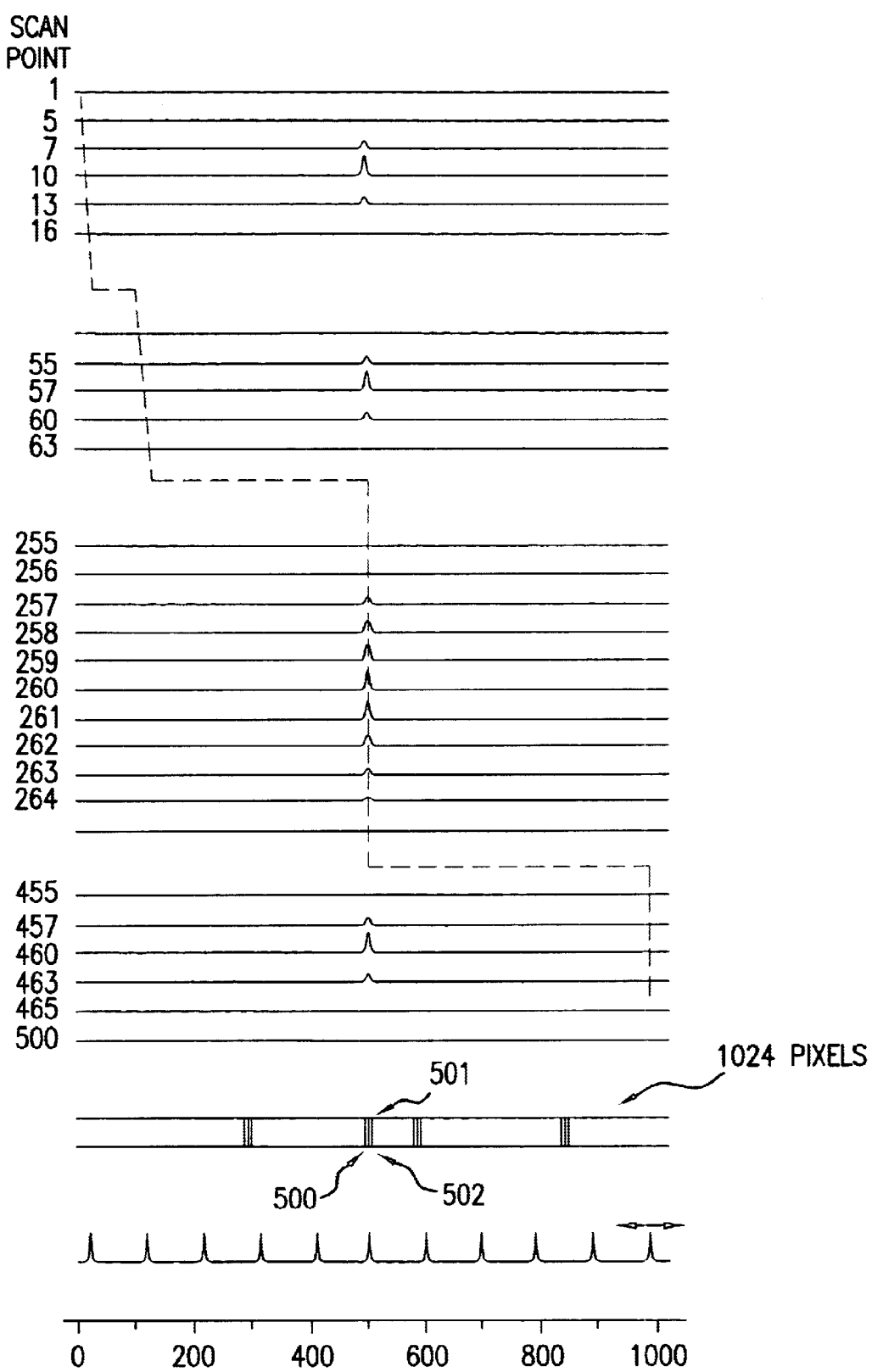

In still another embodiment the laser is tuned to approximately the middle of the grating spectral range and is not scanned as above. The scanning is done by the etalon using a prior art PZT-scanning or pressure scanning technique. These techniques change the optical separation between the etalon plates slightly, so that position of etalon transmission peaks is also changed. Again, for each step in the etalon scan, a complete spectrum registered by the PDA is saved into computer memory. These spectra are shown in FIG. 6B.

The spectrum with the largest peak near the meddle of the etalon scan is identified. That is spectrum number 260 in the FIG. 6B example. The pixel corresponding to the position of the maximum in this spectrum (number 260) is identified. In the example it is pixel number 501. But now for each scanning curves we take subsequent pixels corresponding to scanning of etalon transmission peaks. It is convenient if the step size in the etalon transmission peaks movement correspond to one pixel shift in the spectrums. In this case we shift pixel number by one or two for each new spectrum correspondingly.

The reader should understand that the preferred embodiments described above are by example only and is not intended to limit the scope of the present invention. For example, mirror M2 may not be included so that the light only has the a single dispersion on the grating. The monochromator may be used as a test instrument for accurately measuring bandwidth of a laser periodically with the resulting measurement used to calibrate operational bandwidth instruments on the laser. Alternatively, the present invention could be incorporated into the design of production lasers so that very precise measurement of bandwidth could be made as often as desired. Therefore, the scope of the present invention is to be determined by the appended claims and their legal equivalents.

While the invention has been described above with specificity in terms of preferred embodiments, the reader should understand and recognize that many changes and alterations could be made without deviating from the spirit of the invention. Therefore, the scope of the invention should be determined by the appended claims and their legal equivalents.

We claim:

1. A high resolution spectral measurement device having a very narrow slit function and a relatively large spectral range for monitoring spectra of laser beam, said device comprising:

A) an etalon optical unit configured to monitor a beam of narrow band ultraviolet light and to produce interference fringes, said etalon optical unit comprising:

1) a diffuser positioned to diffuse said light into a very large number of directions to produce a diffuse beam;
2) an etalon positioned in the path of said diffuse beam;
3) a first slit aperture; and
4) a lens unit positioned to collect light passing through said etalon and to focus a portion of the passing light through said first slit aperture, B) a grating spectrometer unit comprising:
1) a collimating optical unit positioned to collect light passing through said first slit aperture,
2) a grating positioned in an approximately Littrow configuration to reflect said collimated light back through said collimating optical unit so that spectral components of reflected light are focused by said collimating optical unit at positions dependent on wavelength of said spectral components,
3) a detector means,
4) a mirror positioned to reflect to said detector means a portion of said light passing back through said collimating optic, and C) a scanning means for scanning said laser beam so as to permit collection of sufficient spectral data by said detector means to permit precise determination said spectra of said laser beam.

2. A spectral measurement device as in claim 1 wherein said monitor is a mononchromator and said detector means is a slit and a light monitor.

3. A spectral measurement device as in claim 2 wherein said scanning means comprises a line narrowing module comprising grating and a tuning mirror for scanning the laser beam on said grating.

4. A spectral measurement device as in claim 1 wherein said monitor is a spectrometer and said detector means comprises a detector array.

5. A spectral measurement device as in claim 4 wherein said detector array is a photodiode array.

6. A spectral measurement device as in claim 4 wherein said scanning means comprises a line narrowing module comprising grating and a tuning mirror for scanning the laser beam on said grating.

7. A spectral measurement device as in claim 4 wherein said scanning means comprises an etalon scanning means.

8. A spectral measurement device as in claim 7 wherein said etalon scanning means comprises a piezoelectric transducer for scanning gaps between etalon plates.

9. A spectral measurement device as in claim 7 wherein said etalon scanning means comprises a pressure scanning means for scanning pressure in a gap in said etalon.

10. A spectral measurement device as in claim 1 wherein said grating spectrometer is a double pass grating spectrometer.

11. A high resolution spectral measurement device having a very narrow slit function and a relatively large spectral range for monitoring spectra of light beam, said device comprising:

C) an etalon optical unit configured to monitor a beam of narrow band ultraviolet light and to produce interference fringes, said etalon optical unit comprising:
5) a diffuser positioned to diffuse said light into a very large number of directions to produce a diffuse beam;
6) an etalon positioned in the path of said diffuse beam;
7) a first slit aperture; and
8) a lens unit positioned to collect light passing through said etalon and to focus a portion of the passing light through said first slit aperture, D) a grating spectrometer unit comprising:
5) a collimating optical unit positioned to collect light passing through said first slit aperture,
6) a grating positioned in an approximately Littrow configuration to reflect said collimated light back through said collimating optical unit so that spectral components of reflected light are focused by said collimating optical unit at positions dependent on wavelength of said spectral components,
7) a detector means,
8) a mirror positioned to reflect to said detector means a portion of said light passing back through said collimating optic, and C) a scanning means for scanning said light beam so as to permit collection of sufficient spectral data by said detector means to permit precise determination said spectra of said light beam.

12. A spectral measurement device as in claim 11 wherein said monitor is a mononchromator and said detector means is a slit and a light monitor.

13. A spectral measurement device as in claim 12 wherein said scanning means comprises a line narrowing module comprising grating and a tuning mirror for scanning the light beam on said grating.

14. A spectral measurement device as in claim 11 wherein said monitor is a spectrometer and said detector means comprises a detector array.

15. A spectral measurement device as in claim 14 wherein said detector array is a photodiode array.

16. A spectral measurement device as in claim 14 wherein said scanning means comprises a line narrowing module comprising grating and a tuning mirror for scanning the light beam on said grating.

17. A spectral measurement device as in claim 14 wherein said scanning means comprises an etalon scanning means.

18. A spectral measurement device as in claim 17 wherein said etalon scanning meant comprises a piezoelectric transducer for scanning gaps between etalon plates.

19. A spectral measurement device as in claim 17 wherein said etalon scanning means comprises a pressure scanning means for scanning pressure in a gap in said etalon.

20. A spectral measurement device as in claim 11 wherein said grating spectrometer is a double pass grating spectrometer.

* * * * *

UNITED STATES PATENT AND TRADEMARK OFFICE
CERTIFICATE OF CORRECTION

PATENT NO. : 6,713,770 B2 Page 1 of 1
APPLICATION NO. : 10/098975
DATED : March 30, 2004
INVENTOR(S) : Sandstrom et al.

It is certified that error appears in the above-identified patent and that said Letters Patent is hereby corrected as shown below:

<u>Column 8:</u>

Line 1, change "C" to --A--
Line 4, change "5" to --1--
Line 7, change "6" to --2--
Line 8, change "7" to --3--
Line 9, change "8" to --4--
Line 12, change "D" to --B--
Line 13, change "5" to --1--
Line 15, change "6" to --2--
Line 21, change "7" to --3--
Line 22, change "8" to --4--

Signed and Sealed this

Fourteenth Day of November, 2006

JON W. DUDAS
*Director of the United States Patent and Trademark Office*